(No Model.)

M. KAMAK.
SUSPENSION DEVICE.

No. 423,326. Patented Mar. 11, 1890.

WITNESSES:
Edward Wolff.
William J. Miller

INVENTOR:
Max Kamak.
BY
Van Santvoord & Hauff
ATTORNEYS

UNITED STATES PATENT OFFICE.

MAX KAMAK, OF NEW YORK, N. Y.

SUSPENSION DEVICE.

SPECIFICATION forming part of Letters Patent No. 423,326, dated March 11, 1890.

Application filed November 7, 1889. Serial No. 329,471. (No model.)

*To all whom it may concern:*

Be it known that I, MAX KAMAK, a citizen of the United States, residing at New York, in the county and State of New York, have invented new and useful Improvements in Suspension Devices, of which the following is a specification.

This invention relates to improvements in suspension devices; and the invention consists in the details of construction set forth in the following specification and claims, and illustrated in the accompanying drawings, in which—

Figure 1:
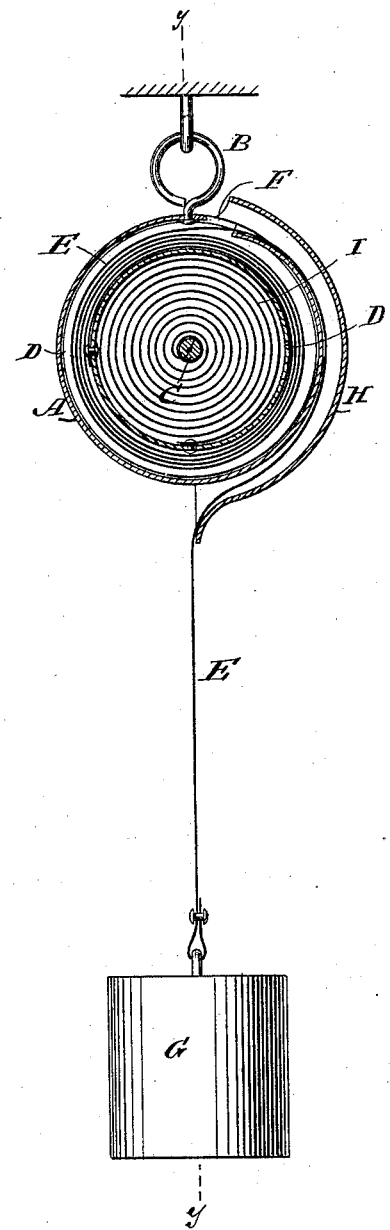
Figure 2:
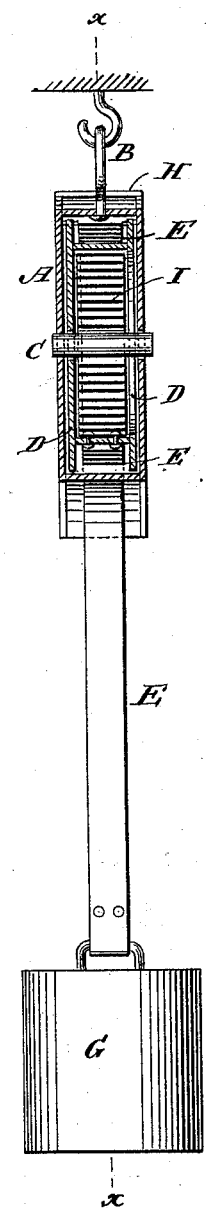

Figure 1 is a longitudinal section along $xx$, Fig. 2, of a suspension device. Fig. 2 is a front elevation of a suspension device, partly in section, along $yy$, Fig. 1.

In the drawings, the letter A indicates a stationary housing or case hung by a support B. The cylindrical housing A serves as a support for the axle C of the rotary drum D, which serves as a spool for winding the suspension cord, tape, or band E. The cord E passes out of the housing A through an opening F, and said cord being led partly about the housing A the friction produced by the contact of the cord with the housing will act as a brake to prevent automatic unwinding of the cord. The cord E can be used to support any weight or object G—such as a lamp, flower-pot, or other article—and the greater the weight of the object G the more firmly will the cord E be drawn against the housing A, so that a corresponding increase in the braking of the cord is attained.

A guide or channel H causes the cord E to pass a certain distance about the housing A, so that a braking-contact is assured between the cord and housing. The drum D has a spring I, and when the weight G is raised the spring causes the drum to rotate so as to wind up the cord E.

What I claim as new, and desire to secure by Letters Patent, is—

1. The combination, with a stationary cylindrical housing, of a suspension-cord made to unwind from and to pass partly about the circular surface of the housing so as to brake itself against such circular surface, substantially as described.

2. The combination, with a stationary cylindrical housing, of a suspension-cord made to unwind from and to pass about the circular surface of the housing so as to brake itself against such circular surface, said housing being provided with a guide for holding the cord about the housing, substantially as described.

3. The combination, in a spring suspension device, of a non-rotating cylindrical housing having an opening, an internal rotating spring-drum, and a suspension-band wound on the spring-drum extending through the opening in the housing and passing in superficial contact with the external circular surface thereof, whereby the housing operates as a brake on the band, substantially as described.

In testimony whereof I have hereunto set my hand in the presence of two subscribing witnesses.

MAX KAMAK.

Witnesses:
W. C. HAUFF,
E. F. KASTENHUBER.